United States Patent  [11] 3,630,533

[72] Inventors Joseph W. Butler;
 Terence A. O'Connor, both of Elyria, Ohio
[21] Appl. No. 57,697
[22] Filed July 23, 1970
[45] Patented Dec. 28, 1971
[73] Assignee Lear-Siegler, Inc.
 Maple Heights, Ohio

[54] DYNAMIC SEAL FOR CRYOGENIC FLUIDS
 8 Claims, 3 Drawing Figs.
[52] U.S. Cl. .................................................. 277/153,
 277/26, 277/205, 285/111, 285/187, 285/331,
 285/354
[51] Int. Cl. ......................................................... F16j 15/02
[50] Field of Search............................................ 277/26,
 153, 157, 163, 165, 205, 206 R; 285/111, 187,
 331, 354, 379

[56] References Cited
 UNITED STATES PATENTS
2,684,119 7/1954 Brown........................... 277/205 X 2,999,701 9/1961 Blair et al. ..................... 285/354 X
3,104,884 9/1963 Kerlin............................. 277/206
3,350,105 10/1967 Browning et al.............. 277/26

*Primary Examiner*—Edward J. Earls
*Attorney*—Oberlin, Maky, Donnelly & Renner

ABSTRACT: A fluid seal between two members comprising a flexible sealing ring containing an open channel having radial inner and outer walls, and a seal groove for receipt of the sealing ring, the radial outer wall of the sealing ring being compressed between the outer member and an additional external member surrounding same, and the radial inner wall of the sealing ring being maintained in sealed engagement with the inner member by one or more springs disposed within the seal channel between the outer member and radial inner wall. The forward end of the outer member is also pressed into the end wall of the sealing ring channel to provide a supplemental or backup compression seal for the outer member.

INVENTORS.
JOSEPH W. BUTLER
TERENCE A. O'CONNOR

Oberlin, Maky, Donnelly & Renner
ATTORNEYS

DYNAMIC SEAL FOR CRYOGENIC FLUIDS

BACKGROUND OF THE INVENTION

This invention relates to a fluid seal for use in preventing fluid leakage between members over a wide range of temperatures and pressures, and is equally effective at cryogenic temperatures.

Heretofore, the most common type of fluid seal for low-temperature applications consisted of an annular sealing ring containing an open channel therein for receipt of a spring. During assembly of the sealing ring between the parts to be sealed, the spring was initially deformed to preload the channel walls of the sealing ring into sealing engagement with the adjacent sealing surfaces of both parts. The disadvantage of such a seal arrangement is that it provides two separate leakage paths between parts, and while the spring will effectively maintain the sealing ring in sealed engagement with both parts at ambient temperatures or above when the seal is exposed to extreme cold such as encountered in cryogenic applications, the spring is depressed, whereby leakage may occur through the radial outer leakage path.

Various means have been devised to compensate for temperature changes by varying the loading force applied to the walls of the sealing ring with variations in temperature, but they considerably add to the cost and complexity of the seal.

SUMMARY OF THE INVENTION

With the foregoing in mind, it is a principal object of this invention to provide an improved seal including a novel sealing ring and seal groove configuration which eliminates one of two possible leakage paths between members to permit effective use of the coefficients of expansion of the different materials of the parts to prevent leakage through the other leakage path.

These and other objects of the present invention may be achieved by providing a seal in which the sealing ring contains an open channel having radial inner and outer walls, and the seal groove has an annular clearance space between the outer member to be sealed and an additional external member providing an interference fit for the radial outer wall of the sealing ring when compressed to prevent leakage through the outer leakage path. The forward end of the outer member is also pressed into the end wall of the sealing ring channel to provide a compression seal therebetween which acts as a backup or supplemental seal assuring against possible leakage through the outer path. The radial inner wall of the sealing ring is maintained in sealed engagement with the inner member at extremely low temperatures because of the higher coefficient of expansion and contraction of the sealing ring material which causes it to more tightly grip the inner member at reduced temperatures, and one or more springs may be inserted in the sealing ring channel to load the radial inner wall at increased temperatures and compensate for possible cold flow of the sealing material.

To the accomplishment of the foregoing and related ends, the invention, then, comprises the features hereinafter fully described and particularly pointed out in the claims, the following description and the annexed drawing setting forth in detail indicative, however, of but one of the various ways in which the principles of the invention may be employed.

DESCRIPTION OF THE PREFERRED EMBODIMENT

Figure 1:
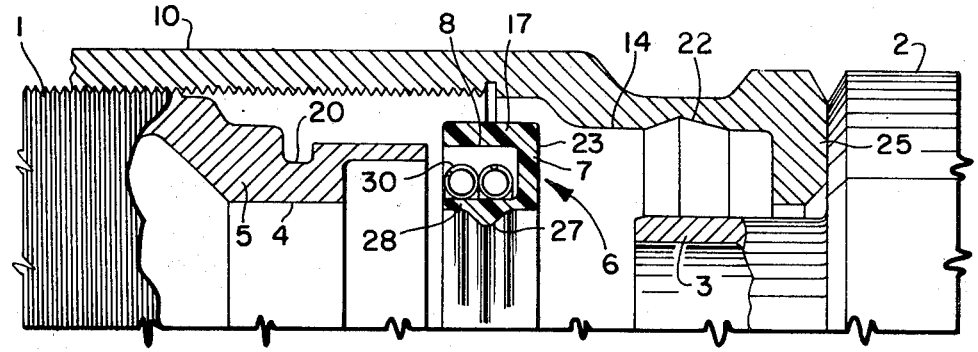
FIG 1 is a fragmentary longitudinal section through a fluid coupling shown in disassembled form including a preferred form of fluid seal constructed in accordance with this invention.

Referring now in detail to the drawing and first especially to FIG. 1, there is shown a pair of metal coupling members 1 and 2 disassembled form which may be used to connect fluid lines for handling fluids over a wide temperature range, including the very low temperatures encountered in handling cryogenic materials such as liquid oxygen, nitrogen and helium. One of the coupling members 2 may have an end portion 3 of reduced outer diameter for telescopic receipt within the bore 4 in the adjacent end portion 5 of the coupling member 1.

Figure 3:
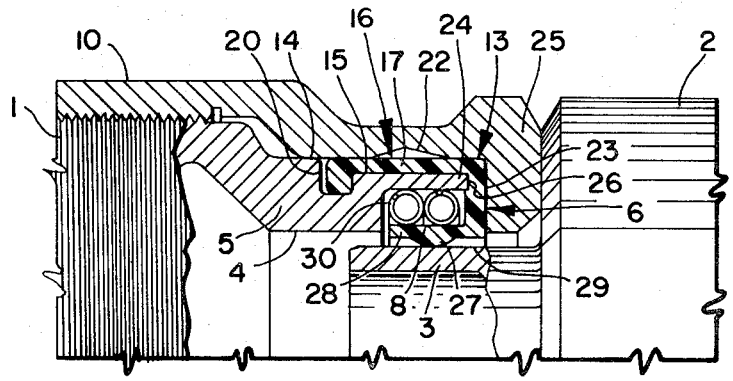
FIG. 3 is a fragmentary longitudinal section showing the coupling parts and fluid seal in final assembled form.

One of the primary concerns with fluid couplings of this type is to maintain a positive seal between parts over a wide temperature range and particularly at extremely low temperatures. Oftentimes, seals which are effective at ambient temperatures and above are not effective at extremely low temperatures because of variations in coefficients of expansion of the coupling materials. Accordingly an improved seal 6 constructed in accordance with the present invention is provided between parts which overcomes the leakage problems of previous known seals by taking advantage of the inherent natural capabilities of the sealing material in a new and novel manner to be described hereafter. As shown, the seal 6 consists of a generally ring-shaped sealing member 7 of a suitable flexible material such as Teflon having an axial opening channel 8 therein. An additional metal member 10 adapted to be secured to the coupling member 1 as by providing internal threads 11 thereon for threaded engagement with external threads 12 on the coupling member 1 defines with the coupling members 1 and 2 a seal groove 13 for the sealing ring 7 when all of the members are properly assembled as shown in FIG. 3.

Figure 2:
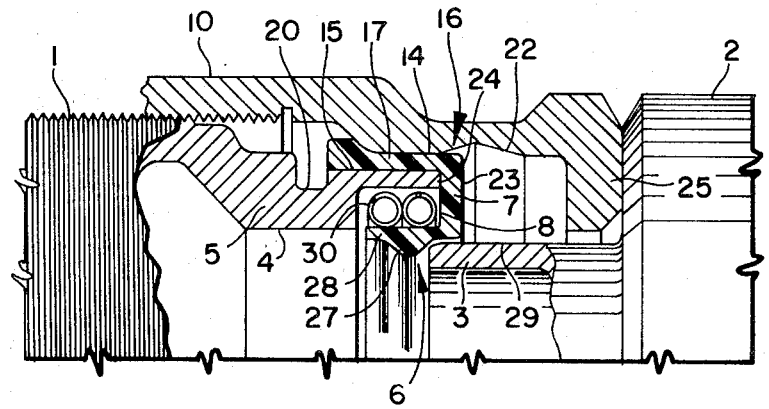
FIG. 2 is a fragmentary longitudinal section similar to FIG. 1 but showing the coupling parts and fluid seal in partial assembled form.

The member 10 has an inner cylindrical sealing surface 14 surrounding the outer cylindrical sealing surface 15 on the end portion 5 of coupling member 1 to provide a clearance space 16 therebetween for the radial outer wall 17 of the sealing ring 7. As shown in FIG. 1, the initial outside diameter of the radial outer wall 17 is slightly greater than the inner diameter of the inner sealing surface 14, and the inner diameter of the radial outer wall 17 is somewhat less than the outer diameter of the outer cylindrical sealing surface 15. Accordingly, when the member 10 is threaded onto the coupling member 1 with the sealing ring 7 disposed therebetween, the radial outer wall 17 is forced into the clearance space 16, causing the material of the radial outer wall 17 to cold flow between parts 1 and 10 as shown in FIG. 2 thus to assure a compression fit of the radial outer wall 17 between the cylindrical sealing surfaces 14 and 15 during assembly. An overflow groove 20 may be provided in the outer surface of the coupling member 1 adjacent the forward end thereof for receipt of any excess material of the radial outer wall 17 during cold flow, and the inner cylindrical sealing surface 14 of the member 10 may be relieved at 22 to reduce the drag between such inner cylindrical sealing surface 14 and radial outer wall 17 during make up of the seal. When the member 10 is fully tightened on the coupling member 1, the end wall 23 of sealing ring 7 is forced against the forward end 24 of the coupling member 1 by an inturned flange portion 25 on the member 10 to cause the forward end 24 to be impressed into the end wall 23, thereby forming another compression seal at 26 between components 1 and 10.

To establish a fluid seal between the sealing ring 7 and other coupling member 2, there is provided a radially inwardly protruding annular rib 27 on the radial inner wall 28, the inner diameter of which is initially somewhat less than the outer diameter of an outer cylindrical sealing surface 29 on the end portion 3 of coupling member 2. Accordingly, when the end portion 3 is shoved into the bore 4 in coupling member 1, the annular rib 27 will be caused to cold flow by the outer cylindrical sealing surface 29, establishing a compression seal therebetween. The amount of interference between the annular rib 27 of sealing ring 7 and coupling member 2 will dictate the force required to obtain a seal during a dynamic application.

If desired, one or more garter springs 30 may also be disposed within the sealing ring channel 8 prior to assembly of the coupling parts to provide a load on the radial inner wall 28 to compensate for possible cold flow of the sealing material and maintain such radial inner wall in sealed engagement with the coupling member 2 at ambient temperatures and above. The forward end of coupling member 1 is counterbored as shown to provide sufficient clearance within the sealing ring channel 8 between the coupling member 1 and radial inner wall 28 for receipt of the garter springs 30 therebetween with the coupling parts fully assembled.

There is no possibility of fluid leakage between the sealing ring 7 and coupling member 2 at low temperatures, since the coefficient of expansion and contraction of the seal material is greater than that of the metal coupling member 2, whereby the lower the temperature, the tighter the seal between the radial inner wall 28 and outer cylindrical sealing surface 29. At extremely high temperatures, leakage is precluded between the sealing ring 7 and coupling member 2 by the garter springs 30 which load the radial inner wall 28 of the sealing ring against the outer cylindrical surface 29. The garter springs 30 also compensate for possible cold flow of the sealing material. However, it will be apparent that under certain conditions the garter springs are not necessary to effect good sealing characteristics between the sealing ring 7 and coupling member 2, particularly when used primarily for ambient or low-temperature applications.

Likewise, there is no possibility of fluid leakage between the sealing ring 7 and other coupling member 1 at low temperatures, since a reduction in temperature will cause the radial outer wall 17 of the sealing ring to shrink to a greater extent than the metal coupling member 1 for achieving a tight seal therewith. Accordingly, the colder the device, the more effective seal. Moreover, even at high temperatures the outer seal is effective because of the manner in which the radial outer wall 17 was compressed within the clearance space 16. The metal outer member 10 also provides a back up for the radial outer wall 17 of the sealing ring to prevent the sealing ring from expanding out of contact with the coupling member at increased temperatures, and the seal between the radial outer wall 17 and coupling member 1 is backed up by the additional compression seal 26 between the forward end 24 of the coupling member 1 and end wall 23 of the sealing ring. In actual practice, it has been found that the seal of the present invention may be used in such extreme temperature environments of −423° F. to +400° F. without leakage.

We, therefore, particularly point out and distinctly claim as our invention:

1. A fluid seal between two members comprising a flexible sealing ring having an axial opening channel therein, said channel having radial inner and outer walls and an end wall, and an additional member surrounding both of said members and defining therewith a seal groove for receipt of said sealing ring, said seal groove including an annular clearance space between said additional member and one of said members in which the radial outer wall of said sealing ring is compressed to preclude leakage therebetween with one end of said one member extending into said channel, and one end of said other member extends into said one member with said radial inner wall of said sealing ring in sealed engagement with the outer surface of said one end of said other member.

2. The fluid seal of claim 1 wherein the initial outside diameter of said radial outer wall is slightly greater than the inner diameter of said additional member, and the inner diameter of said radial outer wall is somewhat less than the outer diameter of said one member, whereby the material of said radial outer wall is caused to cold flow between said one member and additional member during assembly to assure a compression fit of said radial outer wall between said one member and additional member.

3. The fluid seal of claim 2 wherein said one member has an overflow groove in the outer surface thereof adjacent such one end for receipt of any excess material of said radial outer wall during cold flow.

4. The fluid seal of claim 2 wherein the inner surface of said additional member is cylindrical and has a relief therein to reduce the drag between said additional member and radial outer wall during assembly.

5. The fluid seal of claim 1 wherein the outer surface of said one end of said other member is cylindrical, and said radial inner wall of said sealing ring has a radially inwardly protruding annular rib thereon, the inner diameter of which is initially somewhat less than the outer diameter of said one end of said other member to establish a compression seal therebetween during assembly.

6. The fluid seal of claim 1 wherein said additional member has an inturned flange portion which engaged said end wall of said sealing ring during assembly, causing said one end of said one member to impressed into said end wall to form a compression seal therebetween.

7. The fluid seal of claim 1 further comprising spring means surrounding said radial inner wall of said sealing ring for providing a load on said radial inner wall urging said radial inner wall into sealed engagement with said one end of said other member.

8. The fluid seal of claim 7 wherein said spring means comprises a garter spring disposed within said sealing ring channel, said one end of said one member being counterbored to provide sufficient clearance within said sealing ring channel for receipt of said garter spring between said one end of said one member and said radial inner wall of said sealing ring.

* * * * *